(12) United States Patent
Wisniewski (10) Patent No.: US 10,632,819 B2
(45) Date of Patent: Apr. 28, 2020

(54) DEMIST CONTROL FOR HVAC

(71) Applicant: DENSO International America, Inc., Southfield, MI (US)

(72) Inventor: Christopher Wisniewski, Ann Arbor, MI (US)

(73) Assignee: DENSO International America, Inc., Southfield, MI (US)

( * ) Notice: Subject to any disclaimer, the term of this patent is extended or adjusted under 35 U.S.C. 154(b) by 263 days.

(21) Appl. No.: 15/087,343

(22) Filed: Mar. 31, 2016

(65) Prior Publication Data

US 2017/0282686 A1  Oct. 5, 2017

(51) Int. Cl.
*B60H 1/00* (2006.01)

(52) U.S. Cl.
CPC ..... *B60H 1/00842* (2013.01); *B60H 1/00564* (2013.01); *B60H 1/00671* (2013.01); *B60H 2001/00092* (2013.01); *B60H 2001/00714* (2013.01); *B60H 2001/00721* (2013.01)

(58) Field of Classification Search
CPC ............ B60H 1/00842; B60H 1/00835; B60H 1/00864; B60H 1/00871; B60H 1/00664; B60H 1/00671; B60H 1/00678; B60H 2001/00707; B60H 2001/00721; B60H 2001/00714; B60H 1/00021; B60H 1/00564; B60H 2001/00092
See application file for complete search history.

(56) References Cited

U.S. PATENT DOCUMENTS

| 5,624,310 | A | 4/1997 | Fredriksson et al. | |
|---|---|---|---|---|
| 6,193,600 | B1* | 2/2001 | Ito | B60H 1/00678 454/69 |
| 6,520,850 | B1* | 2/2003 | Buckman | B60H 1/00678 137/338 |
| 2001/0014582 | A1* | 8/2001 | Ito | B60H 1/00671 454/69 |
| 2002/0016147 | A1* | 2/2002 | Muller | B60H 1/00671 454/156 |
| 2004/0038639 | A1* | 2/2004 | Yasuno | B60H 1/00678 454/69 |
| 2004/0231834 | A1* | 11/2004 | Shibata | B60H 1/00064 165/204 |
| 2005/0233687 | A1* | 10/2005 | Wachter | B60H 1/00678 454/152 |
| 2007/0062683 | A1* | 3/2007 | Tarukawa | B60H 1/00678 165/202 |

(Continued)

*Primary Examiner* — Tavia Sullens
(74) *Attorney, Agent, or Firm* — Harness, Dickey & Pierce, P.L.C.

(57) ABSTRACT

An HVAC system including a defrost manifold. The defrost manifold has a first side window outlet, a second side window outlet, and a windshield outlet. A first rib partially obstructs the first side window outlet. A second rib partially obstructs the second side window outlet. A control door is movable to open and close the defrost manifold. A first wall extends from a first portion of the control door that is opposite to the first side window outlet. A second wall extends from a second portion of the control door that is opposite to the second side window outlet. Movement of the control door varies the position of the first wall relative to the first rib, and varies the position of the second wall relative to the second rib, to control airflow through the first and second side window outlets.

18 Claims, 4 Drawing Sheets

(56) References Cited

U.S. PATENT DOCUMENTS

2009/0305623 A1 12/2009 Lange et al.
2010/0263828 A1* 10/2010 Chikagawa ........ B60H 1/00678
                165/59
2014/0096554 A1 4/2014 Buczek et al.

* cited by examiner

DEMIST CONTROL FOR HVAC

FIELD

The present disclosure relates to demist control for a heating, ventilation, and air cooling assembly.

BACKGROUND

This section provides background information related to the present disclosure, which is not necessarily prior art.

Motor vehicle heating, ventilation, and air cooling (HVAC) systems typically include an HVAC casing with an evaporator and a heater core housed therein. The casing defines a defrost manifold, which includes a windshield outlet, a left side window outlet, and a right side window outlet. Heated airflow passing through the windshield outlet is directed to a windshield of the vehicle in order to defrost the windshield. Heated airflow passing through the left side window outlet is directed to a left side window of the vehicle in order to demist the left side window. Heated airflow passing through the right side window outlet is directed to a right side window in order to demist the right side window.

One or more control doors are included within the casing to regulate airflow through the defrost manifold. While current HVAC systems are able to suitably control airflow through the defrost manifold to the windshield and the side windows, enhanced airflow control would be desirable. For example, with current HVAC systems it is often the case that in full defrost mode too much demist is directed to the side windows; and in foot heating mode not enough demist is directed to the side windows or too much defrost is directed to the windshield. The present teachings advantageously provide for improved control of airflow through an HVAC case defrost manifold using a single control door, which simplifies manufacturing and operation, and reduces the overall cost of the HVAC system.

SUMMARY

This section provides a general summary of the disclosure, and is not a comprehensive disclosure of its full scope or all of its features.

The present teachings provide an HVAC system including a defrost manifold. The defrost manifold has a first side window outlet, a second side window outlet, and a windshield outlet. A first rib partially obstructs the first side window outlet. A second rib partially obstructs the second side window outlet. A control door is movable to open and close the defrost manifold. A first wall extends from a first portion of the control door that is opposite to the first side window outlet. A second wall extends from a second portion of the control door that is opposite to the second side window outlet. Movement of the control door varies the position of the first wall relative to the first rib, and varies the position of the second wall relative to the second rib, to control airflow through the first and second side window outlets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
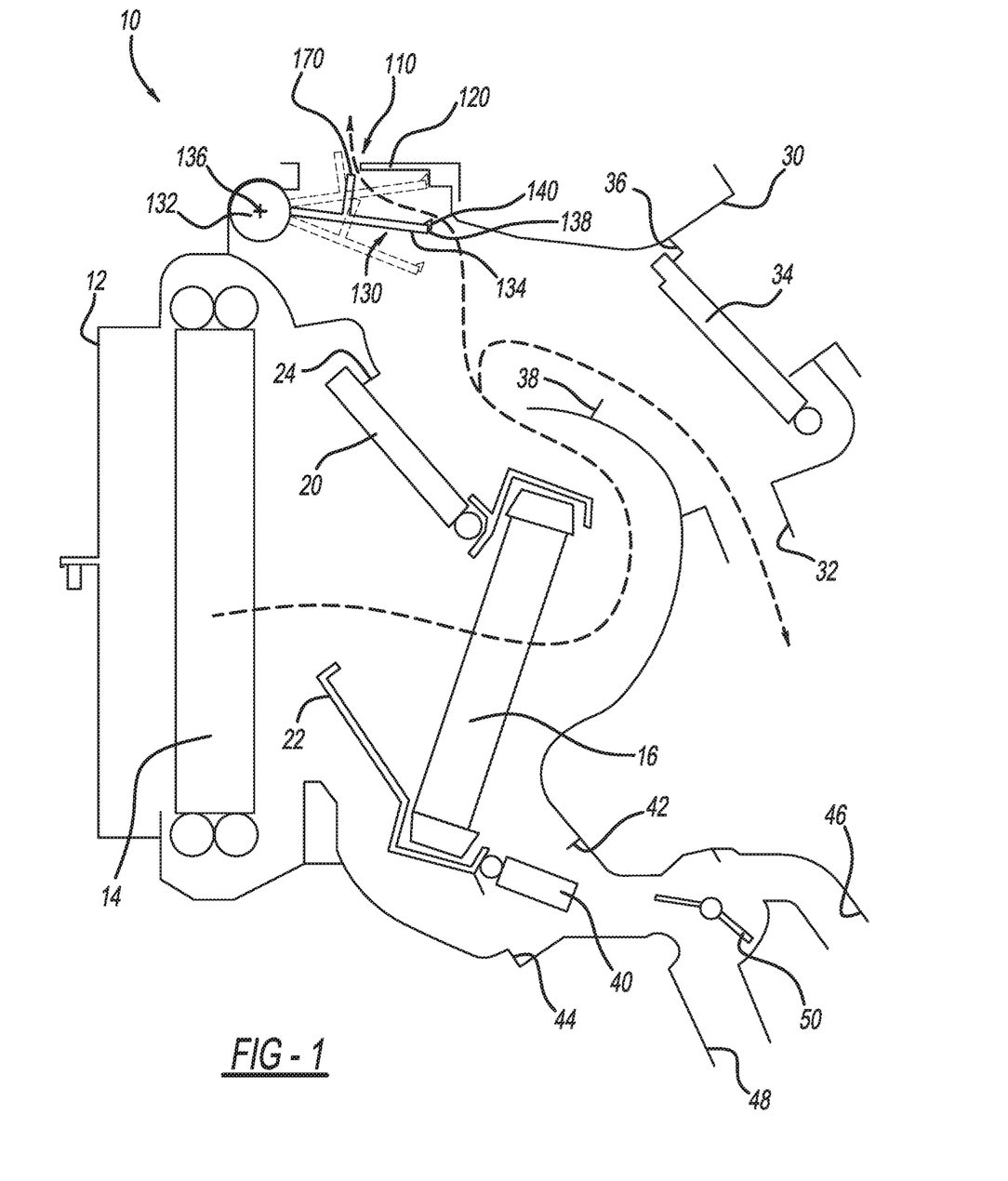
FIG. 1 is a schematic view of an HVAC assembly according to the present teachings.

With initial reference to FIG. 1, a heating, ventilation, and air cooling (HVAC) assembly according to the present teachings is illustrated at reference numeral 10. Although the HVAC assembly 10 is generally described herein as being used in an automobile, the HVAC assembly 10 can be used with any suitable vehicle. For example, the HVAC assembly 10 can be used with any suitable passenger vehicle, mass transit vehicle, military vehicle, watercraft, aircraft, construction vehicle, etc. The HVAC assembly 10 can also be used with any suitable building HVAC system or with any other structure or system where HVAC capabilities are desirable.

The HVAC assembly 10 includes a casing 12, which houses various components of the HVAC assembly 10 including an evaporator 14 and a heater core 16. Mounted within the casing 12, generally between the evaporator 14 and the heater core 16, is a temperature control door 20. The temperature control door 20 is pivotally mounted within the casing 12, such that the temperature control door 20 is movable between a first temperature control door stop 22, and a second temperature control door stop 24. The first and second temperature control door stops 22 and 24 are illustrated as spaced apart flanges of the casing 12. The first and the second temperature control door stops 22 and 24 can each be any suitable feature configured to restrict range of motion of the temperature control door 20. The temperature control door 20 is movable between the first and second temperature control door stops 22 and 24 to regulate or meter the amount of airflow passing through the heater core 16 from the evaporator 14 in order to control the temperature of airflow exiting the casing 12. Although the temperature control door 20 is illustrated as a flag-type door, the temperature control door 20 can be any other suitable type of door, such as a sliding-type door.

The casing 12 defines a plurality of outlets through which airflow can exit the casing 12. For example, the casing 12 defines a front face outlet 30 and a front foot outlet 32. The front face outlet 30 is configured to direct airflow out from within the casing 12 through any suitable conduit to air vents configured to direct airflow towards the faces of persons seated at the front of the vehicle. The front foot outlet 32 is configured to direct airflow towards the feet of persons seated in the front of the vehicle.

Mounted within the casing 12 proximate to the front face outlet 30 and the front foot outlet 32 is a front outlet control door 34. The front outlet control door 34 is movable between a face outlet door stop 36 and a foot outlet door stop 38. When the front outlet control door 34 is positioned against the face outlet door stop 36, airflow may exit the casing 12 through the front foot outlet 32. When the front outlet control door 34 is arranged against the foot outlet door stop 38, airflow is able to exit the casing 12 through the front face outlet 30. When the front outlet control door 34 is arranged between the face outlet door stop 36 and the foot outlet door stop 38, airflow will be able to exit the casing 12 through each one of the front face outlet 30 and the front foot outlet 32.

The casing 12 further includes a first rear outlet control door 40. The first rear outlet control door 40 is movable between a first rear outlet control door stop 42 and a casing stop 44 in order to direct airflow through a rear foot outlet 46 and/or a rear face outlet 48 of the casing 12. The rear foot outlet 46 is configured to direct airflow towards the feet of passengers seated at a rear of the vehicle. The rear face outlet 48 is configured to direct airflow towards faces of passengers seated at a rear of the vehicle. A second rear outlet control door 50 is arranged proximate to the rear foot and face outlets 46 and 48 in order to selectively direct airflow therethrough. The rear foot and face outlets 46 and 48 are optional, and thus the control doors 40 and 50 are as well.

Figure 2:
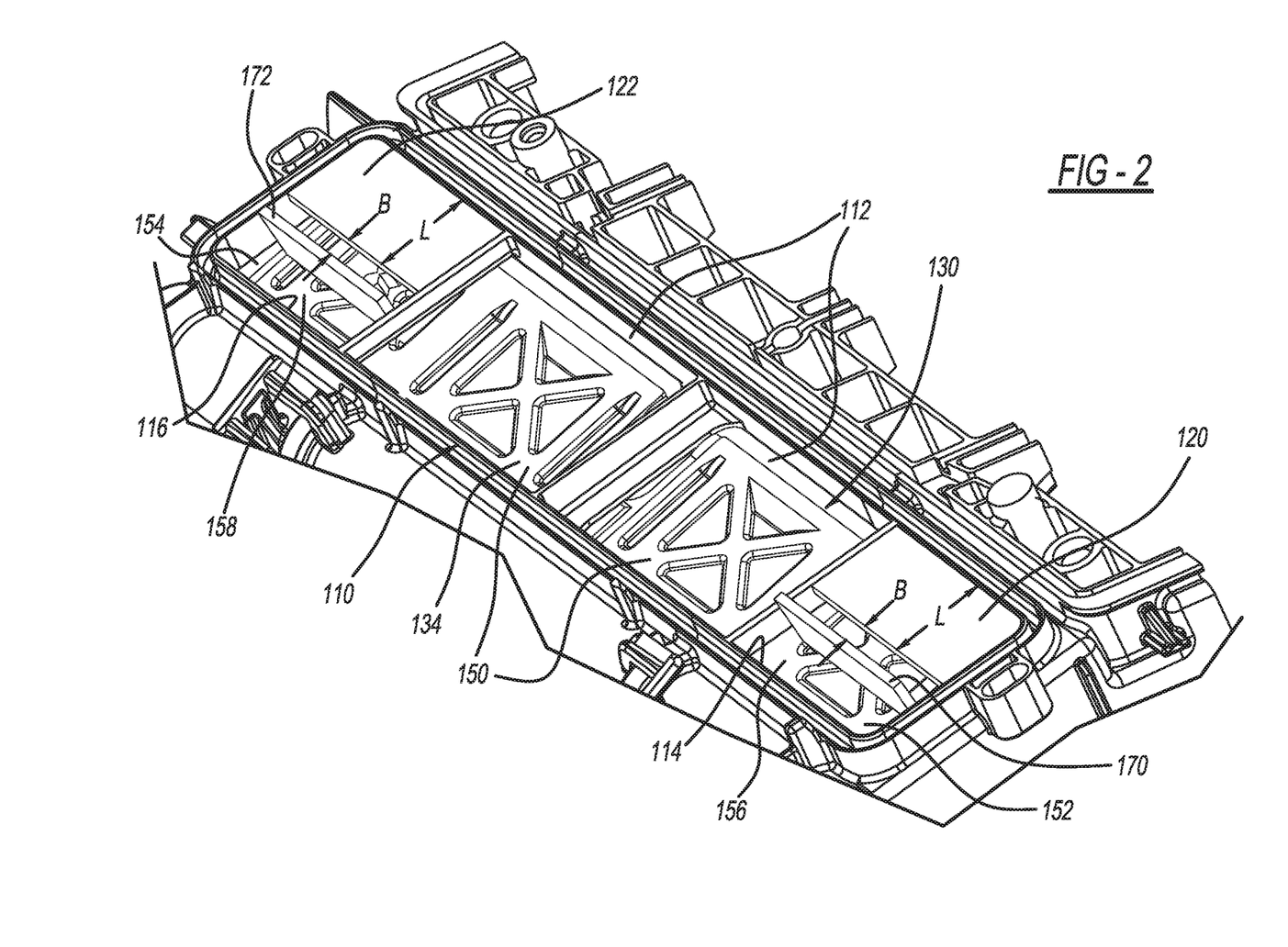
FIG. 2 is a perspective view of an exterior of the HVAC assembly of FIG. 1, and specifically a perspective view of a defrost manifold of the HVAC assembly.

With continued reference to FIG. 1 and additional reference to FIG. 2, the casing 12 defines an additional outlet in the form of a defrost manifold outlet 110. The defrost manifold outlet 110 defines a windshield defrost outlet 112, a first side window demist outlet 114, and a second side window demist outlet 116. The windshield defrost outlet 112 is between the first and second side window demist outlets 114 and 116. The first side window demist outlet 114 can be positioned to direct warmed airflow out from within the casing 12 to a first side window, such as a left side window, of the vehicle in order to demist or defrost the right side window. The second side window demist outlet 116 can be configured to direct warmed airflow out from within the casing 12 to a second side window, such as a right side window, of the vehicle in order to demist or defrost the right side window. The windshield defrost outlet 112 is configured to direct warmed airflow to the windshield of the vehicle in order to defrost the windshield of the vehicle.

The casing 12 further includes a first rib or divider 120 at the first side window demist outlet 114. The first rib 120 is arranged to block and prevent airflow through a portion of (less than an entirety of) the first side window demist outlet 114. Similarly, the casing 12 includes a second rib or divider 122 at the second side window demist outlet 116. The second rib 122 is arranged to block airflow through a portion of (less than an entirety of) the second side window demist outlet 116. Each one of the first and second ribs 120 and 122 extend in a direction generally perpendicular to the direction of airflow through the first and second side window demist outlets 114 and 116.

The HVAC assembly 10 further includes a defrost control door 130. The defrost control door 130 and the first and second ribs 120/122 can be included with any suitable HVAC assembly, and thus the HVAC assembly 10 is provided for exemplary purposes only. For example, the HVAC assembly 10 can alternatively include any other suitable door types in place of those illustrated. Further, the outlets 30, 46, and 48 are optional and can thus be eliminated, and the HVAC assembly 10 can include any other suitable outlets.

The defrost control door 130 includes a base 132 and an elongated panel 134 extending from the base 132 (see FIGS. 1 and 3A-5). The defrost control door 130 is a flat door that pivots at a pivot point 136, which is at the base 132. As further described herein, the defrost control door 130 is movable between a closed position illustrated in FIG. 3A, an open position illustrated in FIG. 3B, and any suitable position therebetween, such as the intermediate position illustrated in FIG. 3C. The base 132 is mounted proximate to the defrost manifold outlet 110 in order to support the elongated panel 134 at the defrost manifold outlet 110 to control airflow through the defrost manifold outlet 110 from within the casing 12.

The elongated panel 134 extends from the base 132, and includes a distal portion 138 that is at a side of the elongated panel 134 opposite to the base 132. Arranged along the distal portion 138 of the elongated panel 134, as well as around all or most of an outer perimeter of the elongated panel 134, is a flexible seal 140. When the defrost control door 130 is in the closed position of FIG. 3A (also illustrated in FIG. 1 in phantom and in FIG. 2), the flexible seal 140 abuts the casing 12 proximate to the defrost manifold outlet 110 in order to seal the defrost manifold outlet 110 and prevent airflow therethrough.

With reference to FIG. 2, the elongated panel 134 of the defrost control door 130 includes a windshield defrost portion 150, which is generally centered along the elongated panel 134 between a first end 152 and a second end 154. Between the first end 152 and the windshield defrost portion 150 is a first demist portion 156 of the defrost control door 130. Between the second end 154 and the windshield defrost portion 150 is a second demist portion 158 of the defrost control door 130. When the defrost control door 130 is in the closed position (see FIGS. 2 and 3A, for example): the windshield defrost portion 150 is arranged opposite to the windshield defrost outlet 112 to block airflow therethrough; the first demist portion 156 is opposite to the first rib 120 and the first side window demist outlet 114 in order to block airflow through the first side window demist outlet 114; and the second demist portion 158 is opposite to the second rib 122 and the second side window demist outlet 116 in order to block airflow through the second side window demist outlet 116.

The defrost control door 130 further includes a first wall 170 and a second wall 172. The first wall 170 extends from the elongated panel 134 at the first demist portion 156. The second wall 172 extends from the elongated panel 134 at the second demist portion 158. The first and second walls 170 and 172 are each arranged such that they extend generally perpendicular to the elongated panel 134.

Figure 3A:
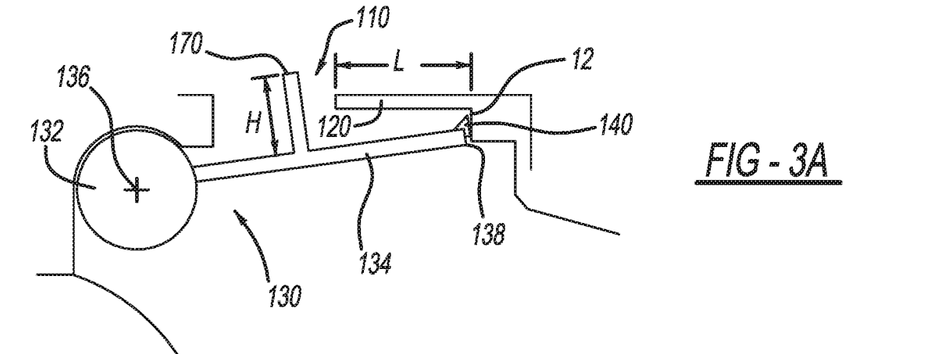
FIG. 3A is a cross-sectional view of a control door of the HVAC assembly of FIG. 1, the control door arranged in a closed position to prevent airflow from passing out of the HVAC assembly through the defrost manifold.
Figure 3B:
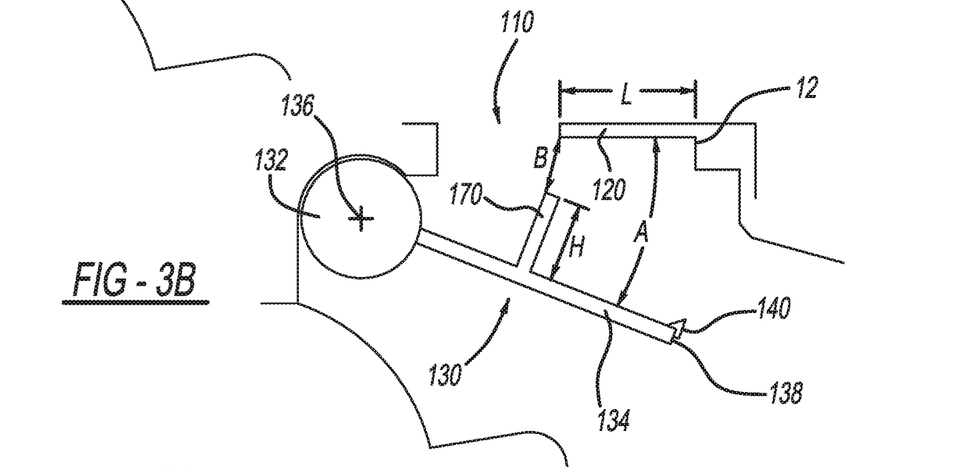
FIG. 3B illustrates the control door of FIG. 3A in an open position.
Figure 3C:
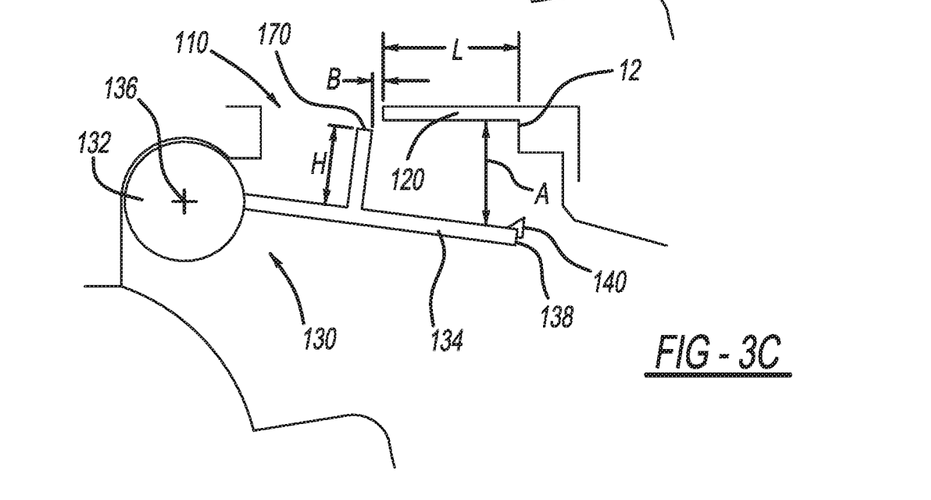
FIG. 3C illustrates the control door of FIG. 3A at an intermediate position.

With reference to FIGS. 3A-3C, for example, the first and second walls 170 and 172 can be provided with any suitable height H, so that the first and second walls 170 and 172 extend any suitable distance from the elongated panel 134. The first and second ribs 120 and 122 can be provided with any suitable lengths L, so that the first and second ribs 120 and 122 extend any suitable distance across the first and second side window demist outlets 114 and 116. When the defrost control door 130 is rotated from the closed position of FIG. 3A to the open position of FIG. 3B, to the closed position of FIG. 3C, or to any position therebetween, a first airflow clearance A is defined between the elongated panel 134 and each one of the first and second ribs 120 and 122.

A second airflow clearance B is defined between the first wall 170 and the first rib 120, as well as between the second wall 172 and the second rib 122.

Exemplary use of the defrost control door 130 to control the amount of airflow passing through the defrost manifold outlet 110 will now be described. To activate the defrost/demist mode of the HVAC assembly 10, the heater core 16 is activated and the temperature control door 20 of FIG. 1 is rotated away from the first temperature control door stop 22 in order to permit airflow to pass through, and be heated by, the heater core 16. When the HVAC assembly 10 is in a maximum defrost/demist mode, the temperature control door 20 can be rotated to abut the second temperature control door stop 24, which permits maximum airflow through the heater core 16. The first rear outlet control door 40 can be positioned away from the rear outlet control door stop 42 to permit airflow towards the rear foot and face outlets 46 and 48. The first rear outlet control door 40 may also be arranged against the rear outlet control door stop 42 in order to direct all airflow away from the rear foot and face outlets 46 and 48. The front outlet control door 34 can be arranged at the face outlet door stop 36, the foot outlet door stop 38, or any position therebetween to direct heated airflow to the front face outlet 30 and/or the front foot outlet 32.

The amount of heated airflow flowing out of the casing 12 through the defrost manifold outlet 110 is controlled by the defrost control door 130. FIG. 3A illustrates the defrost control door 130 in the closed position. In the closed position the flexible seal 140 seals against the casing 12, and thus airflow is restricted from flowing around the defrost control door 130. The elongated panel 134 is arranged to extend across the defrost manifold outlet 110 and block each one of the windshield defrost outlet 112, the first side window demist outlet 114, and the second side window demist outlet 116, thereby preventing heated airflow from passing through the defrost manifold outlet 110.

In the open position of FIG. 3B, the defrost control door 130 is rotated so that the elongated panel 134 is spaced apart from the defrost manifold outlet 110. In this open position, the first airflow clearance A and the second airflow clearance B are defined. Specifically, the first airflow clearance A is defined between the elongated panel 134 and each one of the first rib 120 and the second rib 122. The second airflow clearance B is defined between the first wall 170 and the first rib 120, as well as between the second wall 172 and the second rib 122. As a result, airflow heated by the heater core 16 is able to pass through the first and second airflow clearances A and B and out of the casing 12 through the first and second side window demist outlets 114 and 116 to demist or defrost the front side windows of the vehicle. In the open position of FIG. 3B, heated airflow will also pass through the windshield defrost outlet 112 to defrost the windshield.

The defrost control door 130 can be rotated about the pivot point 136 to any suitable position between the closed position of FIG. 3A and the open position of FIG. 3B in order to control the amount of airflow passing through the defrost manifold outlet 110. For example and as illustrated in FIG. 3C, the defrost control door 130 can be arranged in an intermediate position in which the first and second airflow clearances A and B are smaller as compared to the open position of FIG. 3B. Therefore and as compared to the open position of 3B, less airflow will pass through the first and second side window demist outlets 114 and 116.

The amount of airflow passing through the first and second side window demist outlets 114 and 116 can be fine-tuned by changing the lengths L of the first and second ribs 120 and 122, as well as the heights H of the first and second walls 170 and 172. For example, decreasing the length L and/or the height H will generally increase the size of the second airflow clearance B, thereby permitting additional airflow to pass through the second airflow clearance B to the first and second side window demist outlets 114 and 116. Conversely, increasing the length L and/or the height H will generally decrease the size of the second airflow clearance B, thereby permitting less airflow to pass through the second airflow clearance B to the first and second side window demist outlets 114 and 116. The size of the first airflow clearance A can also be adjusted in any suitable manner to vary or "tune" the volume of airflow passing through airflow clearance A.

Figure 4:
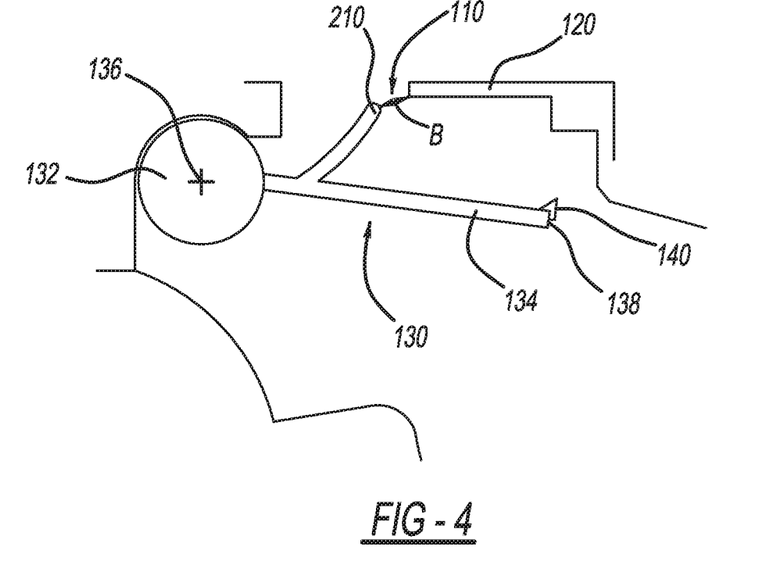
FIG. 4 illustrates another control door according to the present teachings for controlling airflow through the defrost manifold of FIG. 2, the control door including a wall curved in a first direction.
Figure 5:
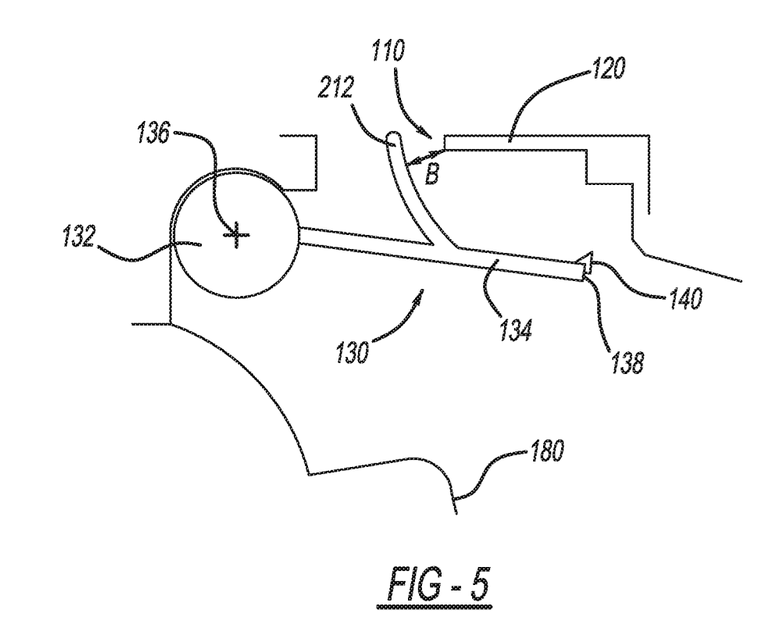
FIG. 5 illustrates another control door according to the present teachings for controlling airflow through the defrost manifold of FIG. 2, the control door including a wall curved in a second direction.

With additional reference to FIG. 4, one or both of the first wall 170 and the second wall 172 can be curved along its length so as to extend towards the first or second rib 120 or 122, as the wall 210 illustrated in FIG. 4 is. Either one or both of the first and second walls 170 and 172 may also be curved away from the first and second ribs 120 and 122 respectively, as the wall 212 of FIG. 5 is. Configuring one or both of the first and second walls 170 and 172 as curved walls 210 or 212 provides numeral advantages. For example, the curved walls 210 and 212 provide enhanced control over the amount of airflow passing through the first and second side window demist outlets 114 and 116. With respect to the curved wall 210, the second airflow clearance B becomes increasing smaller as the defrost control door 130 is rotated open from the closed position. With respect to the curved wall 212, the second airflow clearance B becomes increasingly larger as the defrost control door 130 is rotated open from the closed position.

The present teachings provide numerous advantages. For example, including the first and second ribs 120 and 122, and including the first and second walls 170 and 172 (or curved walls 210, 212) to define the first and second airflow clearances A and B provides greater control over the amount of demist airflow through the first and the second side window demist outlets 114 and 116. Therefore, in the full defrost mode when the defrost control door 130 is moved to the open position of FIG. 3B, a greater amount of heated airflow will pass through the windshield defrost outlet 112 as compared to the first and the second side window demist outlets 114 and 116 due to the presence of the first and the second walls 170 and 172 (or curved walls 210, 212), and the first and second ribs 120 and 122. As a result, in the full defrost mode the present teachings provide enhanced control over the amount of demist airflow passing through the first and second side window demist outlets 114 and 116. An additional advantage is that the present teachings can be integrated into existing tooling, thus eliminating the need for extra parts like doors, levers, and linkages. Specifically, the present teachings can be tooled in the case 12 as well as the door 130. Inserts can be integrated within the door 130 and case 12 to achieve different airflow targets while using the same base tool.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle heating, ventilation, and air cooling (HVAC) system comprising:
   a defrost manifold including a first side window outlet, a second side window outlet, and a windshield outlet;
   a first rib partially obstructing the first side window outlet, the first rib extends in a first direction entirely across the first side window outlet and extends in a second direction partially across the first side window outlet, the first direction is perpendicular to the second direction;
   a second rib partially obstructing the second side window outlet, the second rib extends in a first direction entirely across the second side window outlet and extends in a second direction partially across the second side window outlet, the first direction is perpendicular to the second direction;
   a control door rotatable about a pivot axis to open and close the defrost manifold, the first direction of the first rib is parallel to the pivot axis and the first direction of the second rib is parallel to the pivot axis;
   a first wall extending from a first portion of the control door that is opposite to the first side window outlet, the first wall extending across the first side window outlet parallel to the pivot axis of the control door; and
   a second wall extending from a second portion of the control door that is opposite to the second side window outlet, the second wall extending across the second side window outlet parallel to the pivot axis of the control door;
   wherein the control door is configured such that movement of the control door varies the position of the first wall relative to the first rib, and varies the position of the second wall relative to the second rib, to control airflow through the first and the second side window outlets; and
   wherein in an open position an elongated panel of the control door defines first airflow clearances between the elongated panel and lateral surfaces inward of a leading edge of each of the first and second ribs, and second airflow clearances between the first wall and the leading edge of the first rib and between the second wall and the leading edge of the second rib.

2. The HVAC system of claim 1, wherein the defrost manifold is defined by an HVAC case including an evaporator and a heater core therein.

3. The HVAC system of claim 1, wherein the first rib and the second rib each extend perpendicular to a direction of airflow passing through the defrost manifold.

4. The HVAC system of claim 1, wherein:
   the control door is a single control door including the elongated panel extending across an entirety of the defrost manifold; and
   the first wall and the second wall each extend from the elongated panel.

5. The HVAC system of claim 4, wherein the first wall and the second wall each extend perpendicular to the elongated panel.

6. The HVAC system of claim 4, wherein the first wall is curved towards the first rib or the second wall is curved towards the second rib.

7. The HVAC system of claim 1, wherein the windshield outlet is between the first side window outlet and the second side window outlet.

8. The HVAC system of claim 1, wherein:
the control door is positionable in at least a closed position, the open position, and an intermediate position;
in the closed position the elongated panel of the control door extends across and blocks each one of the windshield outlet, the first side window outlet, and the second side window outlet, and prevents airflow from passing through the defrost manifold; and
in the intermediate position the control door is rotated to a position between the closed position and the open position such that the first airflow clearances in the intermediate position are both smaller than the first airflow clearances in the open position, and the second airflow clearances in the intermediate position are both smaller than the second airflow clearances in the open position.

9. A vehicle heating, ventilation, and air cooling (HVAC) system comprising:
a casing including an evaporator and a heater core;
a first side window demist outlet defined by the casing;
a first rib of the casing extending partially across the first side window demist outlet to partially obstruct airflow through the first side window demist outlet, the first rib extends in a first direction entirely across the first side window outlet and extends in a second direction partially across the first side window outlet, the first direction is perpendicular to the second direction;
a second side window demist outlet defined by the casing;
a second rib of the casing extending partially across the second side window demist outlet to partially obstruct airflow through the second side window demist outlet, the second rib extends in a first direction entirely across the second side window outlet and extends in a second direction partially across the second side window outlet, the first direction is perpendicular to the second direction;
a windshield defrost outlet defined by the casing;
a control door mounted within the casing and rotatable about a pivot axis to open and close each one of the first side window demist outlet, the second side window demist outlet, and the windshield defrost outlet, the first direction of the first rib is parallel to the pivot axis and the first direction of the second rib is parallel to the pivot axis;
a first wall extending from a first portion of the control door that is opposite to the first side window demist outlet, the first wall extending across the first side window demist outlet parallel to the pivot axis of the control door; and
a second wall extending from a second portion of the control door that is opposite to the second side window demist outlet, the second wall extending across the second side window demist outlet parallel to the pivot axis of the control door;
wherein:
the control door is configured such that movement of the control door varies position of the first wall relative to the first rib to control airflow through the first side window demist outlet; and
the control door is configured such that movement of the control door varies position of the second wall relative to the second rib to control airflow through the second side window demist outlet; and
wherein in an open position an elongated panel of the control door defines first airflow clearances between the elongated panel and lateral surfaces inward of a leading edge of each of the first and second ribs, and second airflow clearances between the first wall and the leading edge of the first rib and between the second wall and the leading edge of the second rib.

10. The HVAC system of claim 9, wherein each one of the first rib and the second rib extends perpendicular to the direction of airflow through the defrost manifold.

11. The HVAC system of claim 9, wherein the windshield defrost outlet is between the first side window demist outlet and the second side window demist outlet.

12. The HVAC system of claim 9, wherein the first wall and the second wall each extend from the elongated panel of the control door, which extends across each one of the first side window demist outlet, the windshield defrost outlet, and the second side window demist outlet.

13. The HVAC system of claim 12, wherein the first wall and the second wall each extend perpendicular to the elongated panel.

14. The HVAC system of claim 12, wherein the first wall is curved towards the first rib or the second wall is curved towards the second rib.

15. The HVAC system of claim 12, wherein the first wall is curved away from the first rib or the second wall is curved away from the second rib.

16. The HVAC system of claim 9, wherein:
the control door is positionable in at least a closed position, the open position, and an intermediate position;
in the closed position the elongated panel of the control door extends across and blocks each one of the windshield defrost outlet, the first side window demist outlet, and the second side window demist outlet, and a seal of the control door contacts the casing, to prevent airflow from passing through the first side window demist outlet, the second side window demist outlet, and the windshield defrost outlet; and
in the intermediate position the control door is rotated to a position between the closed position and the open position such that the first clearances in the intermediate position are both smaller than the first clearances in the open position, and the second clearances in the intermediate position are both smaller than the second clearances in the open position.

17. The HVAC assembly of claim 9, further comprising a seal extending around at least a distal portion of an elongated panel of the control door, the seal configured to contact the casing when the control door is in a closed position to prevent airflow through the first side window demist outlet, the second side window demist outlet, and the windshield defrost outlet.

18. The HVAC assembly of claim 9, further comprising a defrost manifold of the casing, the defrost manifold including each one of the first side window demist outlet, the second side window demist outlet, and the windshield defrost outlet.

* * * * *